Mar. 13, 1923.

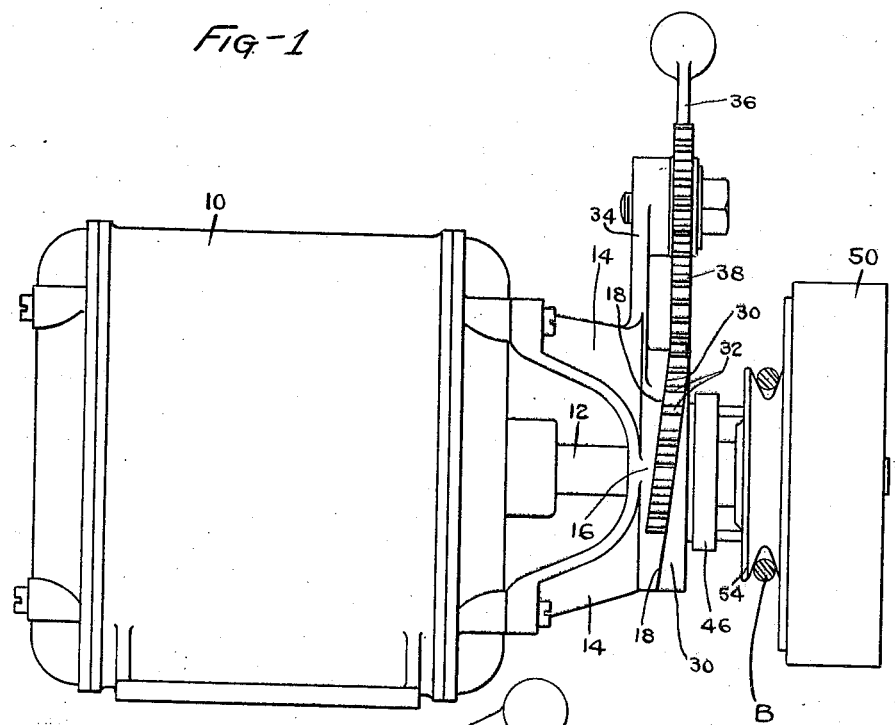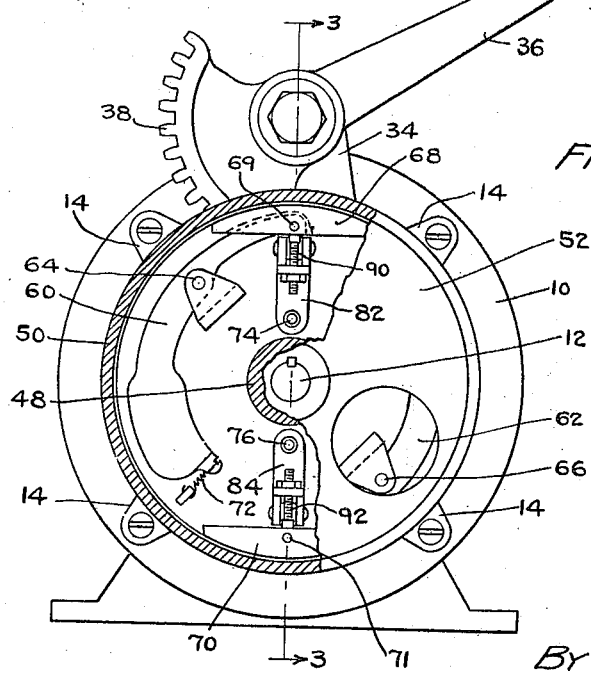

DE WITT NELSON.
DEVICE FOR OBTAINING VARIABLE SPEED FROM CONSTANT SPEED MOTORS.
FILED FEB. 7, 1921.

1,448,034.

2 SHEETS—SHEET 2.

INVENTOR:
DEWITT NELSON.
By Whiteley and Ruckman
ATTORNEYS.

Patented Mar. 13, 1923.

1,448,034

UNITED STATES PATENT OFFICE.

DE WITT NELSON, OF MINNEAPOLIS, MINNESOTA, ASSIGNOR TO THE HORTON MANUFACTURING COMPANY, OF MINNEAPOLIS, MINNESOTA, A CORPORATION.

DEVICE FOR OBTAINING VARIABLE SPEED FROM CONSTANT-SPEED MOTORS.

Application filed February 7, 1921. Serial No. 443,103.

*To all whom it may concern:*

Be it known that I, DE WITT NELSON, a citizen of the United States, residing at Minneapolis, in the county of Hennepin and State of Minnesota, have invented certain new and useful Improvements in Devices for Obtaining Variable Speeds from Constant-Speed Motors, of which the following is a specification.

My invention relates to devices for obtaining variable speeds from constant speed motors, and an object is to provide a device by means of which machines of various kinds may be driven at any desired reduced speed from a motor running at a constant speed. An object in particular is to provide a mechanical device which may be used as a substitute or in place of a variable speed electric motor so that variable speeds may be obtained as desired from a constant speed electric motor by attaching the device for operation in connection with the motor shaft.

The full objects and advantages of my invention will appear in connection with the detailed description, and the novel features embodied in my inventive idea will be particularly pointed out in the claims.

In the accompanying drawings which illustrate my invention in one of the embodiments which it may assume,—

Figure 3:
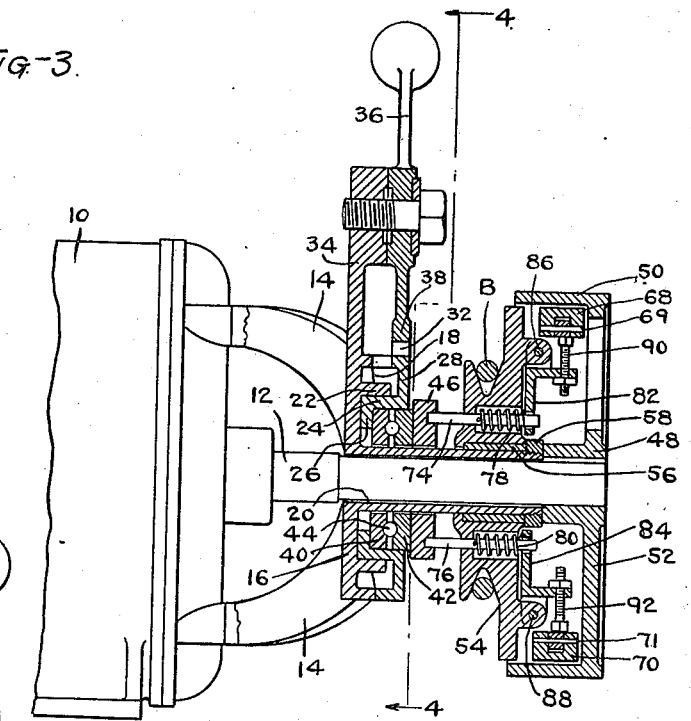
Figure 4:
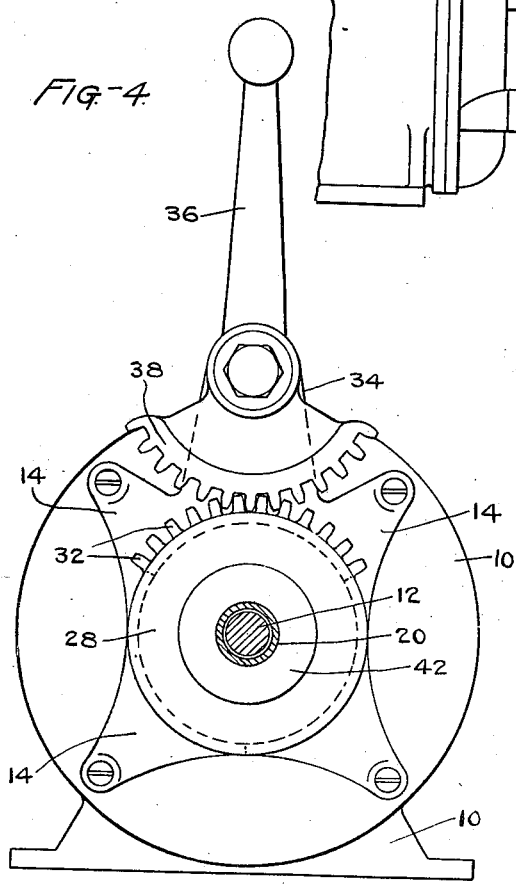
Figure 5:
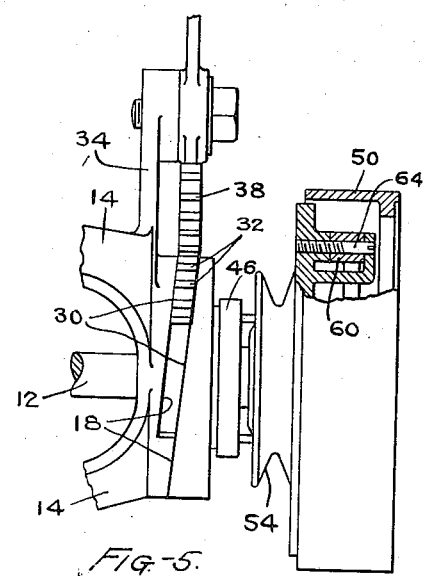

Fig. 1 is a view in side elevation of my device. Fig. 2 is a front end elevational view with a portion of the web of a drum broken away. Fig. 3 is a view showing a portion of the motor in side elevation and the improved device in longitudinal section on the line 3—3 of Fig. 2. Fig. 4 is a view in section on the line 4—4 of Fig. 3. Fig. 5 is a view corresponding to Fig. 1 but with a portion of the drum broken away.

Referring to the particular construction shown in the drawings, the numeral 10 designates as an entirety any suitable motor having a motor shaft 12. In the embodiment shown, this motor is intended to represent more particularly a constant speed electric motor. By means of arms 14, a collar 16 is rigidly secured to the motor frame, this collar having angularly disposed cam faces 18 which are preferably three in number arranged circumferentially. The collar 16 is provided with a sleeve 20 through which a reduced portion of the shaft 12 loosely extends, and this collar is also provided with a ringlike flange 22 within which is rotatably mounted the ringlike portion 24 of a second collar having an inwardly extending annular flange 26 resting upon the face of the collar 16 and an outwardly extending flange 28, as best shown in Fig. 3. The rim of the flange 28 is provided with rearwardly extending inclined cam faces 30 for cooperation with the cam faces 18 and the rear of the flange 28 is also provided with outwardly extending teeth 32 around a portion of its circumference for a distance substantially equal to the length of one of the cam faces 30. These teeth extend parallel to a cam face so that the gear section which they form is inclined at the same angle as the cam face, as will be apparent from Figs. 1 and 5. Extending out from the collar 16 is a lug 34 upon which is pivoted a lever handle 36, the inner end of which is enlarged and made into the form of a sector gear 38 which meshes with the teeth 32. Surrounding the sleeve 20 and in front of the flange 26 are a pair of annular members 40 and 42 separated by a row of ball bearings 44 seated in races in the adjacent surfaces thereof. The annular member 42 engages a collar 46 which is slidable on the sleeve 20. Secured upon the outer end of the shaft 12 is the hub 48 of a drum 50 connected to the hub by a web 52. A pulley 54 adapted to drive a belt B is rotatably mounted on the outer end of the sleeve 20 and as shown is provided with a bushing 56 which engages the sleeve and also engages an end thrust ring 58 screwed upon the end of the sleeve. A pair of arms 60 and 62 are pivoted at 64 and 66 to the forward face of the pulley and these arms at one end are provided with shoes 68 and 70 which are curved to fit the inside of the drum 50 and which are pivoted to the arms by pins 69 and 71. These shoes when the device is not moved into operating position are held out of engagement with the drum by springs 72 attached to the other ends of the arms 60 and 62, so that the drum rotates without rotating the pulley 54. If, however, the lever handle 36 is operated to turn the collar which is provided with the teeth 32, the coaction of the cam faces 18 and 30 slides the collar 46 forwardly, and this forces the shoes into engagement with the drum by means of the following mechanism: The rear ends of the pins 74 and 76 are engaged in sockets in the collar 46 and these pins extend forwardly through the pulley 54. Lying in recesses in this pulley and surrounding the pins 74 and 76 are coiled springs 78 and 80 which at their rear ends are secured to the pins and at their front ends engage bell crank levers 82 and 84 which are pivoted at 86 and 88 to the pulley. The outer ends of the levers 82 and 84 carry bolts 90 and 92 which adjustably engage the ends of the pivoted arms 60 and 62 which carry the shoes 68 and 70, these ends of the arms being held in engagement with the bolts by springs 72 attached to the other ends of the arms.

The operation and advantages of my invention will be obvious from the foregoing description. When the handle 36 is in the position shown in Fig. 2, the motor will cause to rotate at a constant speed the drum 50 which constitutes the driving member of the device. In this position, the shoes 68 and 70 are out of engagement with the drum, and hence, the pulley 54 which constitutes the driven member of the device remains at rest. Upon turning the handle toward the position shown in Fig. 4, the collar which is provided with the teeth 32 is given a rotative movement, and this collar is moved outwardly by the engagement of the cam faces 18 and 30. This slides the collar 46 outwardly upon the sleeve 20, pushing the pins 74 and 76 outwardly in opposition to the tension of the springs 78 and 80, and swinging the levers 82 and 84 so that, as will be apparent from Figs. 2 and 3, the shoes are brought into engagement with the drum with a force depending upon the amount of movement of the handle 36. In this manner, the operator may adjust the operating connections between the driving drum and the driven pulley so that different speeds of the latter may be obtained as desired or as necessitated by the conditions under which the machine driven from the pulley is to operate. Since the teeth 32 extend to an inclined direction corresponding to the inclination of the cam faces, these teeth remain in mesh with the teeth of the sector gear 38. It is to be noted that since the pulley 54 is not mounted directly upon the motor shaft, the latter is relieved of the strain to which it would be subjected if the pulley were positioned directly thereon. The motor shaft, therefore, merely exerts a driving torque without being subjected to sidewise strain. My device provides for obtaining variable speeds from constant speed electric motors, and, hence, serves as a substitute for an expensive and complicated variable speed electric motor.

I claim:

1. A device for obtaining variable speeds from constant speed motors comprising a driving member secured to the motor shaft, a driven member mounted for independent rotation, a rotatable member surrounding said shaft and having inclined cam faces for sliding said member relatively to said shaft, gear teeth on said rotatable member extending in an inclined direction corresponding to the inclination of said cam faces, an operating gear meshing with said gear teeth, friction means interposed between said driving and driven members and carried by one of said members, and connections between said slidable member and said means for causing the latter to engage the other of said driving and driven members to an extent depending upon the movement of said slidable member.

2. A device for obtaining variable speeds from constant speed motors comprising a drum secured to the motor shaft, a fixed sleeve surrounding said motor shaft, a pulley rotatably mounted upon said sleeve, a rotatable member surrounding said shaft and having inclined cam faces for sliding said member relatively to said shaft, a slidable collar surrounding said shaft and adapted to be slid outwardly by the action of said rotatable member, pins engaged with said collar and extending through said pulley, springs tending to hold said pins rearwardly, levers pivoted to said pulley and engaged by the forward ends of said springs, arms pivoted to said pulley, shoes carried by said arms and adapted to be engaged with said drum by the movement of said levers, and springs for normally retracting said shoes.

3. A device for obtaining variable speeds from constant speed motors comprising a drum secured to the motor shaft, a fixed sleeve surrounding said motor shaft, a pulley rotatably mounted upon said sleeve, a rotatable member surrounding said shaft and having inclined cam faces for sliding said member relatively to said shaft, gear teeth on said rotatable member extending in an inclined direction corresponding to the inclination of said cam faces, a gear meshing with said gear teeth, shoes attached to said pulley, and means for causing said shoes to engage said drum to an extent depending upon the movement of said rotatable member.

4. A device for obtaining variable speeds from constant speed motors comprising a drum secured to the outer end of the motor shaft, a fixed collar surrounding said shaft, a sleeve extending forwardly from said collar around said shaft, said collar having forwardly extending cam faces, a rotatable member surrounding said sleeve and having cam faces spring-pressed into engagement with the cam faces of said fixed collar, means for partially rotating said rotatable member, a collar slidably mounted upon said sleeve and adapted to be slid outwardly by the action of said rotatable member, a pulley rotatably mounted on said sleeve, pins engaged with said last mentioned collar and extending through said pulley, springs tending to hold said pins rearwardly, levers pivoted to said pulley and engaged by the forward ends of said springs, arms pivoted to said pulley, shoes carried by said arms and adapted to be engaged with said drum by the movement of said levers, and springs for normally retracting said shoes.

5. A device for obtaining variable speeds from constant speed motors comprising a drum secured to the outer end of the motor shaft, a fixed collar surrounding said shaft, a sleeve extending forwardly from said collar around said shaft, said fixed collar having forwardly extending cam faces, a rotatable member surrounding said sleeve and having cam faces spring-pressed into engagement with the cam faces of said fixed collar, gear teeth on said rotatable member extending in an inclined direction corresponding to the inclination of said cam faces, a sector gear meshing with said gear teeth, a member connected with said sector gear by means of which the operator may move the same around its center, a collar slidably mounted upon said sleeve and adapted to be slid outwardly by the action of said rotatable member, a pulley rotatably mounted on said sleeve, pins engaged with said last mentioned collar and extending through said pulley, springs tending to hold said pins rearwardly, levers pivoted to said pulley and engaged by the forward ends of said springs, arm pivoted to said pulley, shoes carried by said arms at the ends thereof and adapted to be engaged with said drum by the movement of said levers, and springs attached to the other ends of said arms for normally retracting said shoes.

In testimony whereof I hereunto affix my signature.

DE WITT NELSON.